(12) United States Patent
Berger et al.

(10) Patent No.: US 7,342,971 B2
(45) Date of Patent: Mar. 11, 2008

(54) BIPOLAR WAVEFORM MODULATION FOR ULTRA WIDEBAND (UWB) COMMUNICATION NETWORKS

(75) Inventors: Harvey L. Berger, Redondo Beach, CA (US); Gerald R. Fischer, Playa del Rey, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 684 days.

(21) Appl. No.: 10/666,825

(22) Filed: Sep. 16, 2003

(65) Prior Publication Data
US 2005/0058210 A1 Mar. 17, 2005

(51) Int. Cl.
*H04L 27/00* (2006.01)
(52) U.S. Cl. ...................... 375/259; 375/289
(58) Field of Classification Search .......... 375/130, 375/140, 146, 147, 149, 239, 259, 271, 286, 375/287, 289; 455/426.1, 130, 27, 266, 296, 455/311, 313, 323, 324, 403, 422.1; 381/312, 381/321; 342/21, 22, 27
See application file for complete search history.

(56) References Cited

U.S. PATENT DOCUMENTS

| | | | | |
|---|---|---|---|---|
| 3,216,013 A * | 11/1965 | Thor | ........................... | 342/201 |
| 5,949,826 A | 9/1999 | Iiyama et al. | | |
| 6,512,474 B2 * | 1/2003 | Pergande | ...................... | 342/21 |
| 6,539,213 B1 * | 3/2003 | Richards et al. | ........... | 455/226.3 |
| 6,947,492 B2 * | 9/2005 | Santhoff et al. | ............. | 375/289 |
| 7,010,056 B1 * | 3/2006 | McCorkle et al. | ........... | 375/295 |
| 7,082,153 B2 * | 7/2006 | Balachandran et al. | ...... | 375/138 |
| 2003/0053555 A1 | 3/2003 | McCorkle et al. | | |
| 2004/0179631 A1 * | 9/2004 | Nielsen | ....................... | 375/316 |
| 2004/0222865 A1 * | 11/2004 | Romano et al. | ............. | 332/106 |

FOREIGN PATENT DOCUMENTS

| | | |
|---|---|---|
| DE | 101 10 676 A | 9/2002 |
| EP | 0 781 013 A | 6/1997 |

OTHER PUBLICATIONS

International Search Report for PCT/US2004/025248 completed Jan. 31, 2005 by Ó E. Donnabháin.
Cellonics Inc: "*Technical and Business Briefing*", Announcement Cellonics, XX, XX, Apr. 2003, pp. 1-69, XP002274900, p. 38.

* cited by examiner

*Primary Examiner*—Chieh M. Fan
*Assistant Examiner*—Naheed Ejaz
(74) *Attorney, Agent, or Firm*—Tarolli, Sundheim, Covell & Tummino LLP

(57) ABSTRACT

A method for ultra wideband (UWB) communication in which UWB pulses encode binary data as either normal or inverted (anti-podal) pulses. In the case of pulses of a carrier signal, each pulse has the carrier signal either inverted or in phase, that is, shifted by 180°, or not. For example, a binary "1" may be encoded as a normal or non-inverted pulse and a binary "0" as an inverted pulse. After each carrier pulse is rectified and filtered, detection is effected using a threshold value of zero, resulting in increased immunity to noise, compared with detection of unidirectional pulses. In one aspect of the invention, data pertaining to multiple communication channels are encoded in time-divided portions of each UWB pulse.

3 Claims, 1 Drawing Sheet

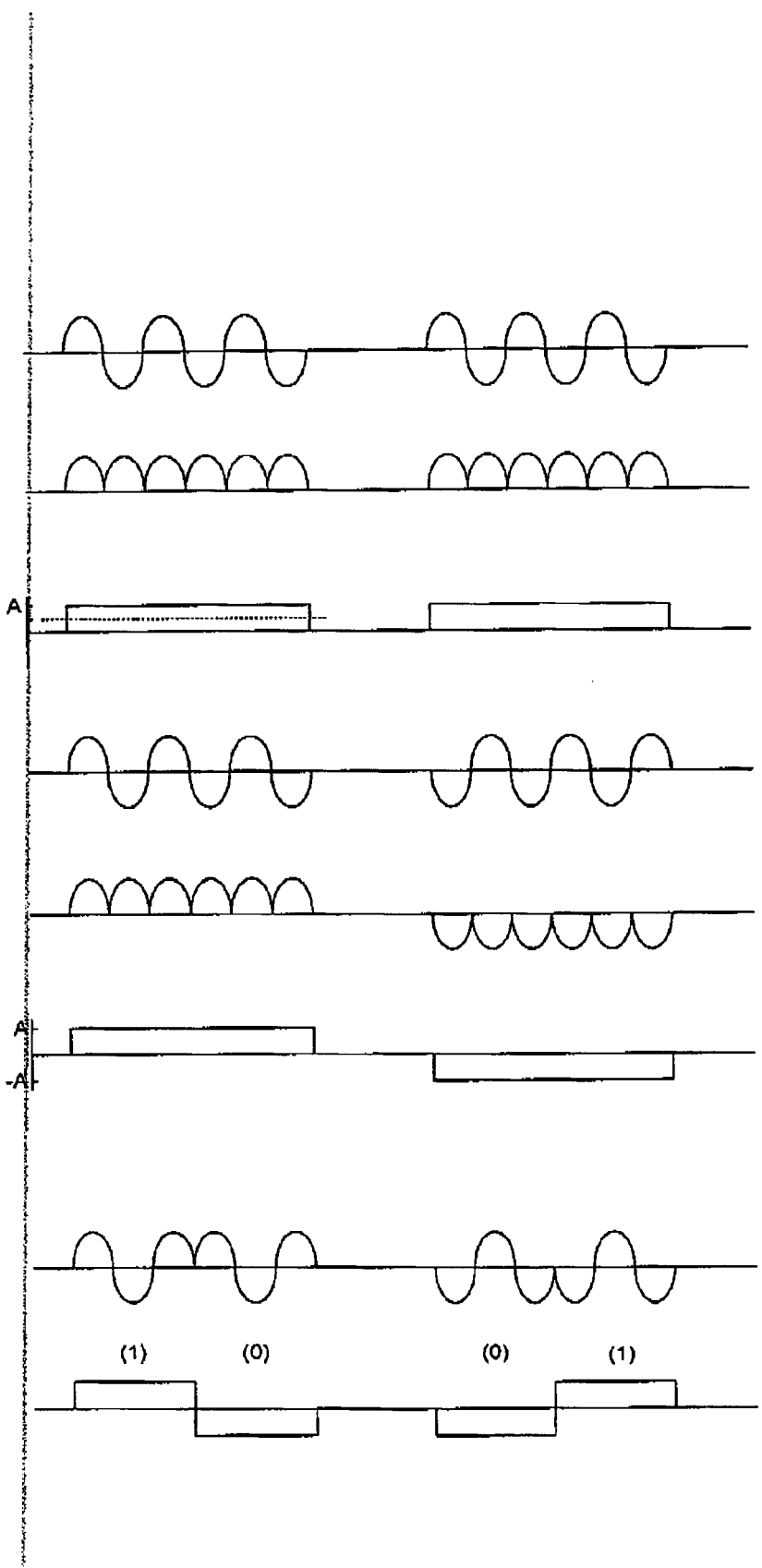

BIPOLAR WAVEFORM MODULATION FOR ULTRA WIDEBAND (UWB) COMMUNICATION NETWORKS

BACKGROUND OF THE INVENTION

The present invention relates generally to communication systems using ultra wideband (UWB) pulses and, more particularly, to techniques for increasing user capacity in UWB transmitters. Communication by UWB pulses, sometimes referred to as impulse radio communication, is a known but not yet widely used technique. The term "impulse radio" is generally used to describe UWB systems in which there is no carrier signal contained within the pulses. The term UWB may also be applied to systems in which the transmitted pulses are bursts of a radio frequency carrier signal. An extremely narrow electromagnetic pulse inherently contains a wide band of frequencies. Adding information to a stream of UWB pulses may be effected by pulse position modulation, wherein the instantaneous value of an information signal sample is used to modulate the position in time of a UWB pulse. At a more fundamental level, UWB pulses may also be modulated by their presence or absence in an otherwise periodic train of pulses. These principles are known in the technical literature and are conveniently summarized in U.S. Pat. No. 5,677,927, issued to Fullerton et al.

Because UWB communication utilizes a large band of the frequency spectrum, it offers the advantages of security and resistance to jamming. Because UWB communication utilizes bandwidth inefficiently, governmental authorization of its use has been limited to relatively low powers. UWB communication, even at low powers, offers the advantages of a relatively long range, the ability to penetrate walls of buildings, and low transceiver cost. However, communication by UWB pulses has some practical limitations, such as the difficulties inherent in applying the technique to multiple users. For example, one possible application of UWB communication systems is for supplying Internet and television connection to homes, as an alternative to coaxial cable, optical fiber cable, or satellite dish communication. UWB communication is ideal for this purpose because it permits the transmission of information at high data rates, using relatively low cost transceivers and processors at user sites. One inherent shortcoming of UWB communication systems, however, is that they allow only one user to receive unique information during any given time interval. The Fullerton et al. patent (U.S. Pat. No. 5,677,927) teaches the use of subcarriers of different frequencies or different waveforms to add channelization to impulse radio signals used in UWB transmission.

An analogous technique for providing multiple user access to communication systems is code division multiple access (CDMA), as used in mobile telephone systems. Multiple users of a CDMA system may share a common frequency band and transmit at the same time, but their information signals are distinguishable from each other because each user is associated with a different code used for spectrum spreading. The codes are said to be orthogonal, which means that they are independently detectable in a receiver. Thus, in CDMA systems, multiple information signal channels may share a single spread-spectrum transmission system. Applying some form of CDMA to UWB transmission would, however, increase the complexity and cost of the modulation and detection equipment.

UWB communication systems that use the presence or absence of a signal to detect whether a user is transmitting during a particular time slot have an inherently low noise signal threshold level. In general if a UWB pulse in a particular time slot has a peak amplitude A, the signal threshold used to determine the presence or absence of a signal is one-half the peak value, or A/2. Thus, when the noise level exceeds an amplitude A/2 the noise will be mistaken for the presence of a signal.

U.S. Pat. No. 6,026,125 discloses techniques for modulating the phase, frequency, bandwidth, amplitude and attenuation of UWB pulses, but it will be appreciated that there is a need for a relatively simple approach for providing better resistance to channel noise in UWB communication systems, thereby facilitating reuse of a time slot by multiple users. The present invention is directed to this end.

BRIEF SUMMARY OF THE INVENTION

The present invention resides in a method for communicating binary data in an ultra wideband (UWB) communication system. Briefly, and in general terms, the method comprises the steps of encoding binary data of one value type, either a "1" or a "0," as positive UWB pulses, and binary of the other value type as negative UWB pulses; and detecting the presence of positive and negative UWB pulses using a zero-level sensing threshold, thereby increasing immunity to noise.

In one disclosed embodiment of the invention, each UWB pulse includes a carrier signal, and each negative UWB pulse has its carrier phase inverted. The step of detecting positive and negative UWB pulses includes sensing whether the carrier phase is inverted or not. The resulting signal is bipolar, wherein the two signal polarities may be used to indicate binary signal values. Noise immunity is improved because a zero-level threshold may be used and the level difference between the threshold and the amplitude of each pulse is twice the level difference that would be needed if unidirectional pulses were used to encode data by their presence or absence.

In accordance with one disclosed embodiment of the invention, the UWB pulses are generated in predetermined time slots, and the method further comprises the step of assigning portions of each time slot to respective communication channels. In this manner, data signals pertaining to multiple communication channels are transmitted in a single time slot. More specifically, in the disclosed example of this embodiment each UWB pulse time slot has two half time slots, and data signals pertaining to first and second communication channels are encoded in the first and second halves, respectively, of each UWB pulse time slot.

It will be appreciated from the foregoing that the present invention is provides a significant advance in the field of UWB communication systems. In particular, the invention provides for encoding data as UWB pulses that are either inverted (anti-podal) or not. For UWB pulses of a carrier signal, data pertaining to multiple communication channels may be encoded in single UWB time slots. Other aspects and advantages of the invention will become apparent from the following more detailed description, taken in conjunction with the accompanying drawings.

BRIEF DESCRIPTION OF THE DRAWINGS

FIGS. 1A, 1B and 1C are signal waveforms that together depict how UWB pulses of carrier signals were detected and decoded in the prior art.

FIGS. 2A, 2B and 2C are signal waveforms that together depict how UWB pulses of different polarities are detected and decoded in accordance with one aspect of the present invention.

FIGS. 3A and 3B are signal waveforms that together depict how multiple data signals may be encoded and detected in individual time slots of UWB pulses.

DETAILED DESCRIPTION OF THE INVENTION

As shown in the drawings for purposes of illustration, the present invention pertains to techniques for sharing an ultra wideband (UWB) communication system among at least two users. For example, the users may be home owners having a need to receive wideband communication data from television or Internet service providers without using underground coaxial cables, optical fiber cables, or satellite dish antennas.

FIG. 1A shows in diagrammatic form a sequence of two UWB pulses of a carrier signal. For purposes of illustration, the carrier is shown as having a long period relative to the length of each pulse, but it will be understood that in a practical system there will be many carrier cycles within a single pulse. The carrier is typically a sinusoidally varying signal, illustrated diagrammatically in the figures.

Detection of the pulse is conveniently effected by rectifying the received signal, to yield a waveform like the one shown in FIG. 1B. The negative-going portions of the carrier are inverted by the rectifying step, resulting in the full-wave-rectified signal of FIG. 1B. This signal is then passed through a low-pass filter, to produce a series of pulses similar to those shown in FIG. 1C. If one assumes that the amplitude of these pulses is A, an appropriate threshold height for detecting the presence of a pulse would be A/2. That is to say, any signal detected below the amplitude A/2 would be considered to be noise.

FIGS. 2A, 2B and 2C illustrate detection of UWB carrier pulses in accordance with an important aspect of the present invention. FIG. 2A shows a sequence of two UWB pulses, in which the second pulse is phase inverted with respect to the first. If the two pulses are rectified as shown in FIG. 2B and then low-pass filtered to produce the waveforms of FIG. 2C, a carrier pulse of the first type produces a positive-going pulse of amplitude A and a carrier pulse of the second type produces a negative-going pulse (amplitude −A). This arrangement requires the use of a phase detector or correlator to determine whether the received carrier is "normal" or phase-inverted, to effect an appropriate switching of the rectifier to produce a negative output pulse when the phase-inverted carrier is detected.

There are two benefits that arise from the use of oppositely phased carrier pulses. First, if carrier pulses of the positive type are used to encode digital ones and carrier pulses of the negative type are used to encode digital zeros, a threshold at zero amplitude can be used to detect the pulses. The threshold distance, i.e., the distance between the threshold level and the amplitude of the pulse is A for either of the pulse types. This compares favorably with a threshold distance of A/2 for the conventionally encoded pulses of FIG. 1. Therefore, the invention provides greater immunity to noise.

Another benefit of the encoding technique is that positive and negative carrier pulses may be conveniently applied to represent data for two different users. In particular, information for two users may be encoded into a single time slot of a carrier pulse, as illustrated in FIG. 3, in which the first half of each carrier pulse is used to code data for User #1 and the second half of each carrier pulse is used to code data for User #2. FIG. 3A shows a normally phased carrier in the first half of a first carrier pulse and a phase-inverted carrier in the second half of the first carrier pulse. The second carrier pulse is shown has having a phase-inverted first half and a normal second half. FIG. 3B shows the resulting signals after rectification and filtering. If a normally phased carrier is chosen to represent a "1" and a phase-inverted carrier represents a "0," the illustration of FIGS. 3A and 3B shows the encoding of the data sequence "10" for the first halves of the carrier pulses, and a data sequence "01" for the second halves of the carrier pulses. The half sections of the carrier pulses may be used to represent data for separate users, for example.

It will be understood that the same principles discussed above are also applicable to UWB communications using pulses with no carrier signal. A positive-going UWB pulse may be used to represent a logical "1," for example, and a negative-going pulse to represent a logical "0." The threshold level for pulse detection is set at zero amplitude, providing improved immunity to noise.

It will be appreciated from the foregoing that the present invention represents a significant advantage over UWB communication systems of the prior art. In particular, the present invention provides a technique of bipolar carrier pulse waveforms, to allow information for multiple users to be encoded into a single time slot, and to provide improved noise immunity. It will also be appreciated that, although a specific embodiment of the invention has been described for purposes of illustration, various modifications may be made without departing from the spirit and scope of the invention. Accordingly, the present invention should not be limited except as by the accompanying claims.

The invention claimed is:

1. For use in an ultra wideband (UWB) communication system, a method for communicating binary data, having logical "0" and "1" value types, as a sequence of UWB pulses each including a carrier signal, the method comprising:
   encoding binary data of one value type as positive UWB pulses and binary data of the other value type as negative UWB pulses having an inverted carrier phase;
   sensing whether a carrier phase of received UWB pulse is inverted or not;
   rectifying and filtering the received UWB pulse to provide a unidirectional signal;
   adjusting the polarity of the unidirectional signal based on whether the sensed carrier phase is inverted or not; and
   detecting the binary data of the adjusted unidirectional signal using a zero-amplitude sensing threshold, thereby increasing immunity to noise.

2. A method as defined in claim 1, wherein:
   the UWB pulses are generated in predetermined time slots; and
   the method further comprises assigning portions of each time slot to respective communication channels, whereby data signals pertaining to multiple communication channels are transmitted in a single time slot.

3. A method as defined in claim 2, wherein:
   each UWB pulse time slot has two half time slots;
   data signals pertaining to first and second communication channels are encoded in the first and second halves, respectively, of each UWB pulse time slot.

* * * * *